United States Patent

[11] 3,586,352

| [72] | Inventor | August Hendrik Maria Smulders<br>Wassenaar, Netherlands |
|------|----------|---------------------------------------------------------|
| [21] | Appl. No. | 767,217 |
| [22] | Filed | Oct. 14, 1968 |
| [45] | Patented | June 22, 1971 |
| [73] | Assignee | Single Buoy Mooring Inc.<br>Zug, Switzerland |

[54] SWIVEL STRUCTURES FOR MOORING-BUOYS OR THE LIKE
2 Claims, 3 Drawing Figs.

[52] U.S. Cl. .................................................. 285/134,
285/328, 285/276
[51] Int. Cl. ................................................ F16l 39/04
[50] Field of Search .......................................... 285/134,
93, 14, 328, 276

[56] References Cited
UNITED STATES PATENTS

| 2,786,698 | 3/1957 | Bard | 285/276 |
| 3,314,694 | 4/1967 | Faccou | 285/276 X |
| 2,062,305 | 12/1936 | Gillette | 285/328 X |
| 2,967,640 | 1/1961 | Roberts | 285/93 X |
| 3,089,713 | 5/1963 | Scaramucci | 285/14 |
| 3,141,685 | 7/1964 | Watts | 285/93 |
| 3,414,918 | 12/1968 | Petrie et al | 285/134 X |

FOREIGN PATENTS

| 752,354 | 7/1933 | France | 285/93 |
| 790,262 | 2/1958 | Great Britain | 285/14 |

Primary Examiner—Thomas F. Callaghan
Attorney—Young & Thompson

ABSTRACT: A swivel for a mooring buoy for simultaneously transferring at least two fluids to or from a vessel, comprises a fixed swivel body and a relatively rotatable swivel head with concentric duct ends that meet at horizontal bearing faces with circular packing rings between them. A concentric bearing spaced from these concentric bearing surfaces is adapted to bear both radial and axial loads. This last bearing has a rotatable member which is releasably secured to the swivel head by bolts which provide the only means for tightening down the swivel head on the packing rings.

INVENTOR
AUGUST HENDRIK MARIA SMULDERS
BY Young & Thompson
ATTORNEYS

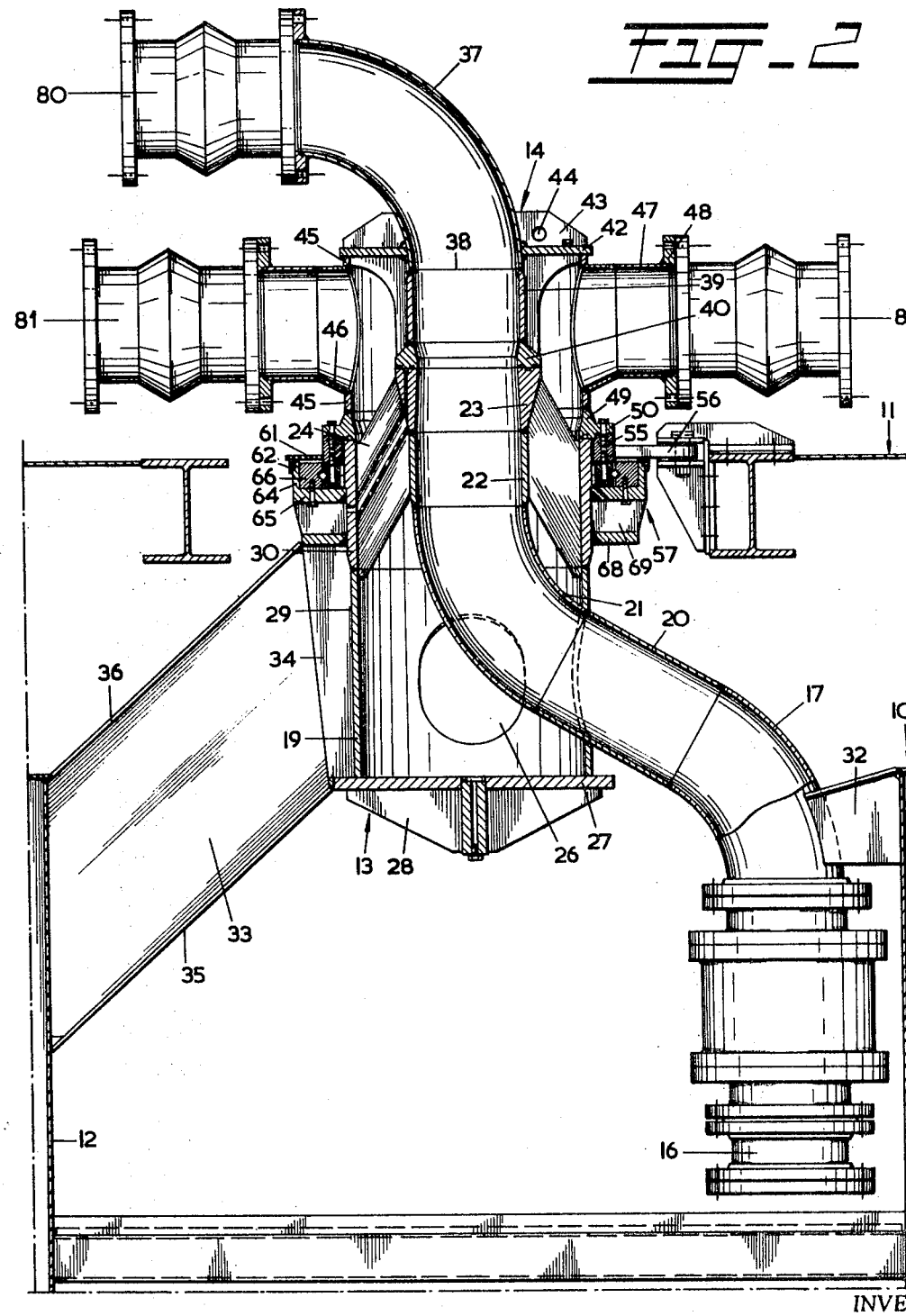

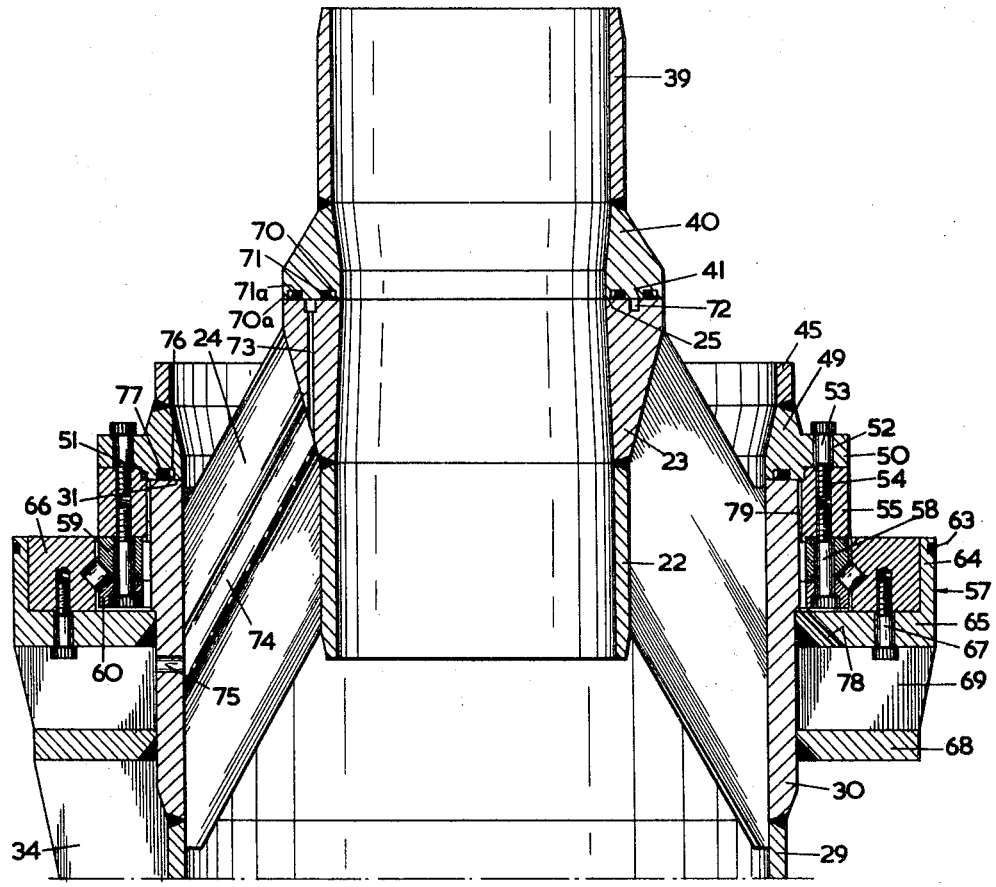

SWIVEL STRUCTURES FOR MOORING-BUOYS OR THE LIKE

The invention is concerned with sealing problems in swivels as applied in conjunction with mooring buoys, in particular swivels for transferring two or more fluids simultaneously.

One of the problems occurring in swivels is a sealing problem. The swivels in question can be subjected to high pressures, due to the pumping of liquids, such as crude oil and its derivatives to and from a vessel. Two or more fluids may be pumped simultaneously whereby appreciable pressure differences may occur across the seals. Leakage may be introduced under those circumstances in said seals through lack of alignment of the engaging surfaces or wear of the packing rings used.

Prior swivels comprised concentric stationary and rotatable tubular bodies with packings in between. The packing was compressed axially by means of a packing gland tightened through bolts, so as to expand the packing radially to provide a sealing engagement with the rotatable tube. When leaking was observed, the bolts had to be tightened.

As is known from the conventional packing boxes, once wear has set in, the packing gland has to be adjusted more tightly to provide for the required sealing action. The frequency of tightening increases with advanced wear, difficulties in obtaining an even pressure on the packing are not uncommon especially for large diameter glands, the danger of the mobility of the joint being impaired by overtightening is ever present and a high degree of concentricity of the sealing surfaces must be maintained. A further disadvantage is that the sealing surfaces other than those of the packing cannot be readily reconditioned in case wear has taken place.

Structures are also known in which the compression on the sealing rings is maintained automatically at a substantially constant value. However, such structures are costly, because they are composed of a large number of parts which open many paths to allow liquid to leak. These paths have to be sealed off individually by means of additional packing rings. For these reasons the structures provided with means to automatically maintain a certain pressure on the sealing rings have met with objections in practice.

An object of the invention is to provide an improved sealing means.

Another object is to provide for ease of maintenance such as inspection, replacement of the packing rings and general overhaul.

Furthermore, it is an object to provide for better control of leaks, in view of the economic loss and hazards caused by intermixing of the fluids which are being transferred.

The invention provides for a swivel for a mooring buoy for simultaneously transferring at least two fluids to or from a vessel, including a swivel body fixed to the buoy and having at least two concentric ducts ends extending upwardly, and a swivel head with corresponding downwardly extending duct ends mounted rotatably and in sealing engagement on the swivel body through corresponding substantially horizontal faces facing each other, at least one sealing ring being disposed in a circular groove in one face of each pair of corresponding faces to engage the opposite face, the swivel head being fixed to the rotatable member and the swivel body to the stationary member of the two members of a bearing adapted to take up both axial and radial loads, in which the means to tighten the said bearing to the swivel body and head are the only means to tighten the packing rings between the said pairs of corresponding substantially horizontal opposing faces between the swivel body and swivel head, the packing rings being dimensioned to provide for the required compression of the packing rings between the said pairs of opposing faces and for wear.

The said circular grooves to house the said packing rings are preferably located in the downwardly facing faces of the swivel head. This allows for easy removal of the packing rings and cleaning of the grooves.

For a better sealing action two packing rings may be disposed at the faces, in particular at the face intermediate two ducts.

To provide for an efficient leak control, a circular groove may be made in the upper face of the swivel body intermediate the location of the packing rings, which groove opens to the outside of the swivel body through at least one downwardly and outwardly extending bore and downwardly and outwardly connecting tube transversing the space of the outer duct. This arrangement serves simultaneously as leak detector and as prevention for the liquids pumped to intermix, since the said groove may be kept at substantially atmospheric pressure.

Further improvements of the sealing means are provided by the invention because the sealing surfaces are contained in planes at right angles to the direction of rotation of the swivel, and this renders the concentricity of the stationary and rotating parts of the swivel noncritical in obtaining a satisfactory seal, and because the mechanical isolation of the swivel bearing allows alignment of the sealing surfaces to be maintained independently of the other components of the mooring buoy. The ability of the invention to maintain the alignment of the sealing surfaces in this manner leads to low friction of the packing rings on these surfaces and subsequent low wear. The wear of the packing rings and sealing surfaces can be reduced still further by lining the sealing surfaces with a suitable material such as stainless steal.

In order that the invention may be better understood, an advantageous embodiment will be described with reference to the accompanying drawings, wherein:

FIG. 2 is on an enlarged scale a cross section along the line II–II in FIG. 1;

FIG. 3 is a view of the central portion of FIG. 2 on a still larger scale.

Figure 1:
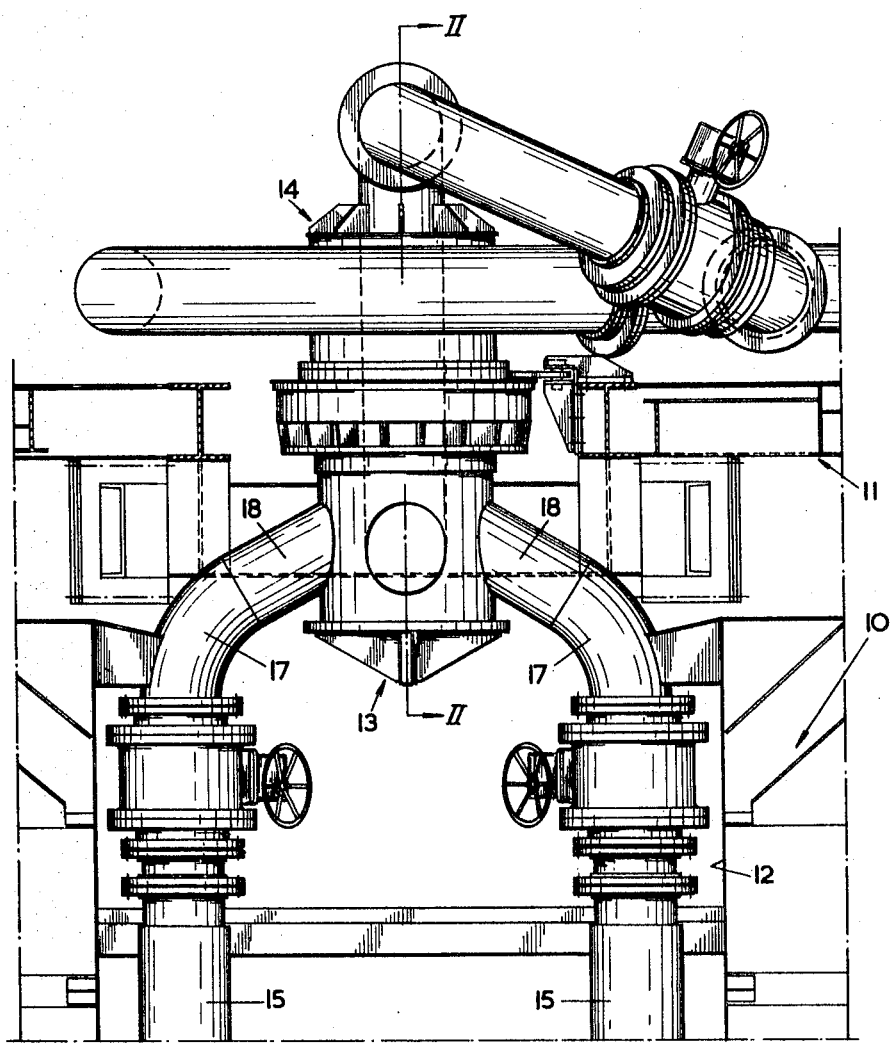
FIG. 1 is a cross section through the central portion of the mooring buoy with the fluid transfer system in side elevation.

Referring to the drawings, 10 designates the floating structure (float) of the buoy in question. A platform 11 is rotatably supported in a known manner by float 10. Float 10 has a vertical well 12 in which is secured a swivel system, composed of a swivel body 13 and a swivel head 14. To the swivel body 13 lead vertical ducts 15 and 16 through duct bends 17 alike for all vertical pipes, and connecting pieces 18 which are welded to casing 19 to connect pipes 15 with casing 19 of swivel body 13. Pipe 16 passes after bend 17 through a connecting piece 20 through the wall of swivel body casing 19 and is welded thereto. To connecting piece 20 is welded within casing 19 a second bend 21 to direct the flow vertically upwards. To bend 21 is connected a vertical duct section 22 to which is welded duct end 23. Duct end 23 and duct section 22 are welded to swivel body casing 19 through circumferentially spaced junction plates 24.

The end face of duct end 23 is a horizontal flat face 25 and constitutes the end face of the central duct of the swivel body 13.

Ducts 15 open into swivel body casing 19 through openings 26 and are welded there to casing 19.

Swivel body casing 19 is substantially cylindrical and at the bottom it is closed by plate 27 reinforced by substantially triangular radial ribs 28.

Swivel body casing 19 is composed of cylindrical section 29 and a thicker walled cylindrical section 30. The end face of cylindrical section 30 is machined to form a horizontal face 31 constituting the end face of the outer duct in swivel body 13.

Pipes 15 are connected to float 10 through joining plates 32, whereas swivel body casing 19 is rigidly connected to float 10 through joining plate 33 and 34. All joining plates are preferably reinforced as e.g. by means of transverse end plate 35 and 36 on joining plate 33.

Swivel head 14 has a duct bend 37 of 90°, the horizontal opening 38 being directed downwardly. At that end a cylindrical, vertical connecting piece 39 is welded thereto. Downwardly therefrom is welded a duct end 40 having a machined horizontal face 41 forming a mating face for upper face 25 of swivel body duct end 23. To duct bend 37 is welded a centrally bored circular plate 42, between which and bend 37 are welded circumferentially spaced vertical, substantially triangular reinforcing ribs 43. A number, e.g. three, of these reinforcing ribs are horizontally bored to provide holes 44 for the attachment of cables or the like to lift the swivel head 14.

Concentrically about the lower end of bend 37 is welded to plate 42 a cylindrical piece 45 to which is welded at least one transition piece 46, in the present example two in number. The upper flange of bend 37 is connected via a flexible member 80 known in the art to further piping.

To transition pieces 46 which extend substantially horizontally, are welded connecting pieces 47 with flanges 48 for a bolted connection to further pipes via flexible members 81.

Extending down from cylindrical piece 45 and welded thereto is a cylindrical portion 49 which is widest at its base and has a connecting flange 50. The base of cylindrical piece 49 is machined to form a horizontal face 51 to mate with face 31 of cylindrical piece 30 of swivel body casing 19.

Flange 50 has a number of circumferentially spaced vertical bores 52 to permit bolts 53 to be passed therethrough to engage threaded bores 54 in a ring 55 which surrounds the top portion of swivel body casing 19 with a slight clearance 79. To ring 55 are welded a number of circumferentially spaced lugs 56 which are secured to platform 11 in any convenient manner. Ring 55 is secured to the rotatable portion of the bearing 57 through bolts 58 of which the threaded portions engage threaded bores 54, the bolts 58 having sunken heads. The rotatable portion of bearing 57 is composed of two rings 59 and 60 located one above another. Bearing 57 is closed by cover plate 61 having a vertically depending skirt 62 to cover a seal 63 in a vertically upstanding skirt 64 of a supporting ring 65 for the stationary ring 66 of bearings 57. Ring 66 is bolted to ring 65 through a number of circumferentially spaced bolts 67. Furthermore, ring 65 is supported by ring 68 through a number of circumferentially spaced axial lugs 69.

Face 41 of the central duct end of the swivel head 14 has two circular grooves 70 and 70a machined in it to house each a packing ring 71 and 71a respectively. In the mating face 25 of the upper part of the central duct end 23 of swivel body 13 is machined a groove 72 in between the locations of grooves 70.

From grooves 72 a substantially vertical bore 73 leads to the outer side of duct end 23. The space between duct end 23 and cylindrical section 30 of swivel body casing 19 is spanned by a tube 74 from the side at which bore 73 opens into the outer duct of swivel body 13, to a bore 75 through the wall of cylindrical section 30.

The lower face 51 of the outer duct end 49 of the swivel head is provided with a circular groove 76 to house a packing ring 77.

Ring 65 has a downwardly inclined bore 78 to connect the space 79 with atmosphere.

As is apparent from the drawing, the presently claimed structure has a minimum of moving parts which are subjected to wear and a minimum of paths which could give rise to leaks. Packing rings 71 and 77 are housed in grooves machined in the swivel head, the grooves 70 and 76 opened downwardly, so as to be easily cleaned when replacing the packing rings. No dirt is allowed to remain in the grooves, as dirt may form a source of irregularities in compression of the packing rings to the mating opposed face. The packing rings are dimensioned, so that, when tightening bolts 53, all packing rings are compressed against mating opposed faces 25 and 31 respectively. Bolts 53 are the only bolts to unscrew, when the swivel head has to be lifted for inspection, maintenance or replacement of packer rings.

Groove 72, bore 73, tube 74 and bore 75 serve a double purpose, i.e. as leak warning for packing rings 71 and 71a, as well as a prevention for liquids to pass from the inner duct to the outer duct of the swivel or vice versa since the space between packing rings 71 and 71a can be kept at substantially atmospheric pressure or even lower, if desired, so that any leaking fluid will run out bore 75. In a similar way, any leak past packing ring 77 will run out bore 78 and cannot contaminate bearing 57.

Bearing 57 is of a well-known type having an open space between the rotary and stationary members of square cross section in which are housed alternately rollers of which the axes are perpendicular to each other, so as to be equally well adapted to take radial and axial loads.

Once leaks are observed in the packings, it does not pay to try to eliminate these leaks by an increased compression of the packing rings. Apparently, by wear the packing ring surface is roughened and it needs a substantial increase in compression, in order that the packing rings seal properly again. Therefore, the best policy is to replace the packing rings straight away. This being a very simple operation, makes up fully for additional packings in a structure in which it is tried to keep the pressure on the main packer rings substantially constant; additionally, such systems do not provide for any longer life of the main packing rings, whereas the additional packings have to be renewed with greater frequency.

To increase packing life the mating faces of swivel head and swivel body may be lined with stainless steel, e.g. by spray methods.

The additional cost of the packing rings suited for the purpose in question is fully balanced by less costly construction and uninterrupted operation and by the fact that only at relatively long intervals packing rings have to be replaced.

I claim:

1. A swivel for a mooring buoy for simultaneously transferring at least two fluids to or from a vessel, comprising a swivel body fixed to the buoy and having at least two concentric duct ends extending upwardly, a swivel head having correspondingly downwardly extending duct ends mounted rotatably and in sealing engagement on the swivel body, said upwardly and downwardly extending duct ends having confronting substantially horizontal faces, at least one packing ring disposed in a circular groove in one face of each pair of confronting faces to engage the opposite said face, a bearing spaced from and concentric with said faces, said bearings comprising outer ring means fixed to said swivel body and rotatable inner ring means, antifriction means between said fixed and rotatable ring means for bearing both axial and radial loads, means for releasably securing said rotatable ring means to said swivel head and for tightening said swivel head down on said swivel body to compress said packing rings between said pairs of confronting faces, said swivel head having a radially outwardly extending flange thereon, ring means depending from said flange and radially outwardly surrounding the outer of said two concentric duct ends of said swivel body, said flange and the last-named ring means and said inner ring means having aligned vertical openings therethrough, bolts extending downwardly through said flange and upwardly through said inner ring means in axial alignment with each other and terminating in said last-named ring means releasably to secure said inner ring means to said swivel head, said swivel body having an upwardly opening annular recess therein in which said outer and inner ring means are disposed, the outer diameter of said outer ring means being equal to the internal diameter of said annular recess, and bolt means extending upwardly through said swivel body and terminating in said outer ring means to secure said outer ring means to said swivel body.

2. A swivel for a mooring buoy for simultaneously transferring at least two fluids to or from a vessel, comprising a swivel body fixed to the buoy and having at least two concentric duct ends extending upwardly, a swivel head having correspondingly downwardly extending duct ends mounted rotatably and in sealing engagement on the swivel body, said upwardly and downwardly extending duct ends having confronting substantially horizontal faces, at least one packing ring disposed in a circular groove in one face of each pair of confronting faces to engage the opposite said face, a bearing spaced from and concentric with said faces, said bearing comprising outer ring means fixed to said swivel body and rotatable inner ring means, antifriction means between said fixed and rotatable ring means for bearing both axial and radial loads, means for releasably securing said rotatable ring means to said swivel head and for tightening said swivel head down on said swivel body to compress said packing rings between said pairs of confronting faces, said swivel head having a downwardly depending annular portion that surrounds the outer of said two concentric duct ends of said swivel body, said inner ring means having vertical holes therethrough in alignment with vertical holes in said downwardly depending portion, bolts extending up through said inner ring means and terminating in said holes in said downwardly depending portion releasably to secure said inner ring means to said swivel head, said swivel body having an upwardly opening annular recess therein in which said outer and inner ring means are disposed, the outer diameter of said outer ring means being equal to the internal diameter of said annular recess, and bolt means extending upwardly through said swivel body and terminating in said outer ring means to secure said outer ring means to said swivel body.